RECEIVER EMPLOYING CORRELATION TECHNIQUES

Filed May 3, 1966

INVENTOR.
VLADIMIR P. HONEISER
BY Alfred C. Hill
AGENT

United States Patent Office
3,502,989
Patented Mar. 24, 1970

3,502,989
RECEIVER EMPLOYING CORRELATION TECHNIQUES

Vladimir P. Honeiser, Lawrence Township, Mercer County, N.J., assignor to International Telephone and Telegraph Corporation, Nutley, N.J., a corporation of Maryland Filed May 3, 1966, Ser. No. 547,276
Int. Cl. H04b 1/10
U.S. Cl. 325—476 10 Claims

ABSTRACT OF THE DISCLOSURE

A receiver employing correlation techniques for detecting signals immersed in noise which may have experienced Doppler shift or other carrier frequency deviation. In a first embodiment, the received signal and local reference signal are applied to a mixer. The received signal and the output of the mixer are applied to an amplitude modulator. The resultant amplitude modulated signal and the reference signal are correlated after full wave rectification to produce the receiver output. In a second embodiment, the full wave rectification of the first embodiment is eliminated by providing phase synchronization between the reference carrier and received carrier. The receiver output is provided as in the first embodiment and the synchronization is provided by a voltage controlled phase shifter in the reference signal path which is controlled by the output of a second correlator responding to the amplitude modulated signal and the reference signal from the controlled phase shifter. The reference signal input to the first correlator, in the second embodiment, is the output of the controlled phase shifter shifted by a fixed 90°.

Figures 1, 2:
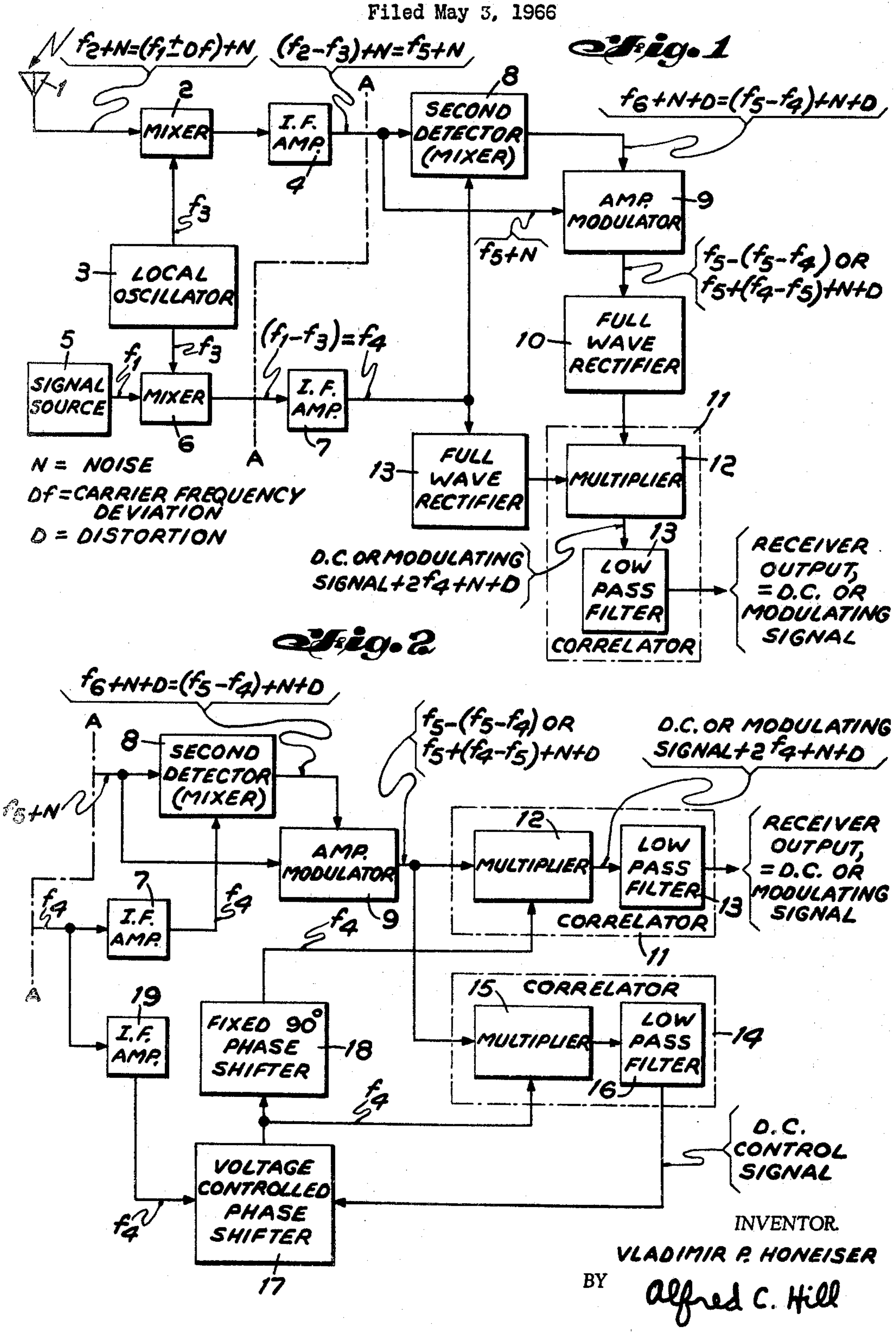

This invention relates to a receiver and more particularly to an improved receiver employing correlation techniques for detecting a signal having a predetermined amplitude characteristic which is fully immersed in noise.

It is known that a receiver bandwidth may be narrowed or correlation techniques may be employed in a receiver to substantially increase the communication range for a fixed transmitter power, or to permit a decrease in transmitted power for a given distance between receiver and transmitter. However, the bandwidth narrowing technique is limited by the information modulation rate. In the case of Doppler shift, or other frequency deviation of the carrier frequency, the receiver passband must be wide enough to accommodate the maximum expected carrier frequency shift. Doppler shift will be experienced in space or aircraft communication, or in radar detection of moving objects.

To enable the utilization of synchronous detection in a receiver, it is necessary that the received carrier frequency be converted to exactly the local or reference frequency of the receiver so that the modulation may be detected. This is particularly true when the signal to be detected is immersed in noise. One way of accomplishing this is the employment of a phase lock system. However, the phase lock system cannot synchronize, or lock, to a fast deviating frequency since it requires a very narrow band, low pass filter, in the order, of one cycle per second, to produce a D.C. output voltage which controls the local oscillator for the lock between the received signal and the local reference signal. Second, in a phase lock system there is a frequency "pull-in" range limitation, that is, a limitation of the separation between the received signal and the local reference signal which limits the accuracy of or ability to achieve the desired lock.

Another system for detecting a received signal immersed in noise is by means of cross correlation techniques. Correlation techniques have the advantage that they cannot be used where there is Doppler shift or other cause of received carrier frequency deviation.

An object of the present invention is to provide a novel receiver employing correlation techniques for detecting signals immersed in noise even though the carrier frequency of the received signal experiences a frequency deviation due to Doppler shift or other causes.

The advantages of the receiver of this invention over a phase lock system are that it can respond to a received signal whose carrier frequency is varying rapidly with respect to the local reference frequency due to a small time constant preceding the correlation arrangement and that it does not have the "pull-in" frequency range limitation of the phase lock system. This latter advantage enables the recever to detect a signal that is separated from the reference frequency by any increment within the receiver passband.

A feature of this invention is the provision of a receiver for detecting a first signal immersed in noise where the first signal has a predetermined amplitude characteristic and a carrier frequency whose value is subjected to interfering frequency deviation comprising a source of the first signal, a source of reference signal having a frequency equal to the undeviated value of the carrier frequency of the first signal, frequency converter means coupled to both the sources, an amplitude modulator coupled to the source of the first signal and the converter means, and a correlator coupled to the modulator and the source of reference signal to produce an output signal proportional to the amplitude characteristics of the first signal.

It should be pointed out that the predetermined amplitude characteristic of the first or received signal may be of constant or slowly changing amplitude, as would occur in a radar system where the echo signal has an amplitude dependent upon the distance the detected object is from the receiver, or it can be a amplitude modulation characteristic where information is conveyed by means of amplitude modulation of the carrier signal that may be pulsed or continuous wave (C.W.) in nature.

Other features of this invention are the provision of a full wave rectifier coupled to both inputs of the first correlator so that the rapid changes in sideband phase angle of the two inputs to the correlator will fluctuate only between zero and some maximum level rather than from a minus value to a plus value due to phase angle changes from plus 180° to minus 180°; and a phase control loop including a second correlator having one input coupled to the output of the amplitude modulator and a voltage controlled phase shifter coupled between the source of reference signal and the other input to the second correlator where the voltage controlled phase shifter is controlled by the resultant D.C. voltage at the output of the second correlator to assure a 90° phase lock between the reference signal and the output signal of the amplitude modulator, or in other words, the first signal, with a fixed 90° phase shifter being coupled between the output of the voltage controlled phase shifter and the input to the first correlator which produces the system output signal.

The above-mentioned and other features and objects of this invention will become more apparent by reference to the following description taken in conjunction with the accompanying drawings, in which:

FIG. 1 is a block diagram of a receiver in accordance with the principles of the invention; and FIG. 2 is a block diagram, substituted for the components to the right of line A—A of FIG. 1, to illustrate another embodiment of the present invention.

FIG. 1 illustrates a receiver incorporating the principles of the present invention. A received signal is detected by antenna 1 and coupled to mixer 2 where in cooperation with local oscillator 3 a beat frequency is produced for application to IF (intermediate frequency) amplifier 4. These components can be considered as being the first source of first signal immersed in noise with the first signal having a predetermined amplitude characteristic and a carrier frequency whose value is subjected to interfering frequency deviation.

The second source of reference signal having a frequency equal to the undeviated value of the carrier frequency of the first signal includes signal source 5 coupled to mixer 6 which in cooperation with local oscillator 3 produces a beat frequency for application to IF amplifier 7.

The signal received by antenna 1 may be a radar echo signal, indicating the distance between the detected object and the receiver, of a radar system having a transmitter who transmits a signal having a frequency equal to the frequency at the output of source 5. The signal of source 5, in this instance, would be the output of the radar transmitter. On the other hand, however, the receiver of this invention is not limited to radar receivers but may be utilized in amplitude modulation communication receivers either of the radio wave or electric signal type, such as, carrier current communication system employed in power transmission systems or the like.

The output signals of amplifiers 4 and 7, the first signal immersed in noise and the reference signal, respectively, are coupled to a second detector 8 which produces at its output a beat frequency derived from the difference between the carrier frequencies of the signals at the output of amplifiers 4 and 7.

The output of detector 8 is coupled to amplitude modulator 9 which has its other input coupled to the output of amplifier 4. The output of modulator 9 is coupled to full wave rectifier 10 and, hence, to correlator 11 including therein a multiplier 12 and a low pass filter 13. The other input of correlator 11 or multiplier 12 is coupled to full wave rectifier 13 which has its input coupled to the output of amplifier 7. The output of correlator 11, in other words, the output of low pass filter 13 is considered the system output and will be either a D.C. signal, a varying D.C. signal, or a modulating signal proportional to the modulating signal of the received signal at antenna 1.

Considering in greater detail the output signal from second detector 8, it is found that the output signal consists of a low frequency envelope having a frequency $f_6$ with no degradation in the signal-to-noise ratio of the weak signal. Since the reference signal at the output of amplifier 7 is much higher in magnitude than the first signal at the output of amplifier 4, these two signals are linearly added in the second detector and produce a small percentage amplitude modulation of the beat frequency $f_6$. Due to the amplitude relationship of $f_4$ and $f_5$, any non-linear distortion in the second detector is avoided.

The action that takes place in the second detector 8 can be demonstrated mathematically as follows:

Let:

R sin $w_4t$=reference signal, and
A sin $w_5t$=first signal, where R equals the amplitude of the reference signal, A equals the amplitude of the first signal, $w_4=2\pi f_4$ and $w_5=2\pi f_5$. Linear addition of the reference and first signals results in:

$$R \sin w_4t+A \sin w_5t \quad (1)$$

Rearranging Equation 1 and employing trignometric identies, the following is obtained:

$$\sin w_4t+m \sin w_5t=p \sin w_6t \quad (2)$$

where $m=A/R$, $p^2=1+m^2+2m \cos (w_5-w_4)t$, and $w_6=2\pi f_6$. If $m$ is small because $R \gg A$ then:

$$p^2=1+2m \cos (w_5-w_4)t \quad (3)$$

Solving Equation 3 for $p$ the following is obtained:

$$p=[1+2m \cos (w_5-w_4)t]^{1/2} \quad (4)$$

By the binomial theorem and utilizing only the first two resultant terms of the binomial series, Equation 4 becomes:

$$p=1+m \cos (w_5-w_4)t \quad (5)$$

Finally, substituting Equation 5 in Equation 2 there is obtained:

$$\sin w_4t+m \sin w_5t=[1+m \cos (w_5-w_4)t] \sin w_6t \quad (6)$$

If $m \ll 1$, then Equation 6 reduces to:

$$\sin w_4t=\sin w_6t \quad (7)$$

which indicates that $w_6$ approximately equals $w_4$ and, therefore, $f_6$ approximately equals $f_4$.

The output of detector 8, that is $f_6$, is used to amplitude modulate the frequency deviated signal $f_5$ in amplitude modulator 9. It is this circuit of the receiver that eliminates the effect of Doppler shift and permits the utilization of correlator 11 to extract the first signal from noise in which it is immersed to produce the system output signal and, hence, an improved signal to noise ratio. The output signal of modulator 9 consists of the carrier $f_5$, upper and lower sidebands, and distortion products. The desired sideband is $f_5-(f_5-f_4)$ if $f_5$ is greater than $f_4$, or $f_5+(f_4-f_5)$ if $f_4$ is greater than $f_5$. The extracted sideband from modulator 9 is multiplied by the reference signal $f_4$ by multiplier 12 of correlator 11 and the product consists of a D.C. signal term, or a varying D.C. signal in a form of modulating signal plus noise, distortion, and a second harmonic of the frequency $f_4$. The low pass filter 13 of correlator 11 extracts the D.C. or low frequency modulating signal to be utilized as the information output of the receiver. The following is a mathematical demonstration of the cancellation of the frequency deviation of the carrier frequency of the received signal ($f_2+N$ where N equals noise) at the output of the amplitude modulator; this demonstration permits the utilization of correlation techniques to recover the amplitude characteristic of the first signal and, hence, the received signal.

$$f_2=f_1 \pm Df \quad (8)$$

where $f_1$ equals the frequency of the signal of source 5 and D$f$ equals the frequency deviation of $f_1$ by means of Doppler shift or other causes of carrier frequency deviation. Local oscillator 3 produces a signal having a frequency $f_3$. The output signal of IF amplifier 4 equals the first signal $f_5+N$, where $$f_5=f_2-f_3=(f_1 \pm Df)-f_3 \quad (9)$$

The reference signal $f_4$ at output of IF amplifier 7 is equal to $f_1-f_3$. The output of the second detector 8 is $$f_6+N+D=f_5-f_4+N+D \quad (10)$$

where D is equal to distortion.

Now, if $f_5>f_4$ the output of modulator 9 is $$f_5-(f_5-f_4)+N+D=f_5-f_5+f_4+N+D=f_4+N+D \quad (11)$$

As will be noted in Equation 11, $f_5$ is cancelled in the output of modulator 9. Noting Equation 9, it is found that cancellation of $f_5$, cancels D$f$, and generates $f_4$, thereby enabling detection of the amplitude of the first signal by cross correlation techniques in correlator 11.

Assuming now that $f_4>f_5$, the output of modulator 9 is $$f_5+(f_4-f_5)+N+D=f_4+f_5-f_5+N+D=f_4+N+D \quad (12)$$

Again under this condition, $f_5$ is cancelled, as indicated in Equation 12, resulting in the cancellation of D$f$, generation of $f_4$ and, thereby, enabling detection of the amplitude of the first signal by cross correlation techniques.

In the receiver of FIG. 1, very rapid changes in the received frequency $f_2$ cause rapid changes in the sideband phase angle, for instance, $f_5-(f_5-f_4)$. In a conventional multiplier, such as multiplier 12, such phase angle changes between the two inputs cause the D.C. output voltage from the correlator 11 to reverse polarity when the phase angle changes from plus 180° to minus 180°. This difficulty is eliminated in the receiver of FIG. 1 by employing full wave rectifiers 10 and 13 on the two inputs of multiplier 12 so that the output voltage from low pass 13 can only fluctuate between zero and some maximum level.

The response time after multiplication in multiplier 12 of the receiver of FIG. 1 and after phase comparison in a phase lock system is determined by the low pass filter which is designed for a cut-off frequency high enough to accommodate the information rate. However, in the receiver of FIG. 1 the response time ahead of the multiplier 12 is extremely short, being determined essentially by the time constant in second detector 8. On the other hand, in the phase lock system the control loop has a time constant of approximately one second to eliminate noise and prevents the local reference oscillator in the loop from locking on a rapidly varying frequency signal.

In addition the receiver of FIG. 1 does not employ a local reference oscillator in a phase lock loop and thus there is no problem of "pull-in" frequency range as there is in the phase lock system where the local reference oscillator is included in the phase lock loop.

In the receiver of FIG. 1, no attempt was made to bring the signal $f_1$ of source 5 or the local reference signal $F_4$ into exact phase synchronism with the received signal $f_2$ or the first signal $f_5$; respectively. The D.C. output of the low pass filter 13 will depend on the relative phase difference between the two signals at the multiplier so that optimum detection of the signals in noise will not occur at all times.

FIG. 2 illustrates an arrangement which includes an addition of circuitry to the receiver of FIG. 1 to obtain optimum detection of the signals immersed in noise but with no "pull in" frequency range limitation. It should be noted, however, that the response time in FIG. 2 is increased due to the phase lock arrangement thereof. In describing FIG. 2, the common circuitry of FIGS. 1 and 2 will employ the same reference character, it of course being remembered that the components to the right of line A—A of FIG. 1 are removed and have substituted in their place the components of FIG. 2.

As in the arrangement of FIG. 1, second detector 8 is coupled to IF amplifier 4 and also to the output of IF amplifier 7 to produce an output for coupling to amplitude modulator 9 which amplitude modulates the output of IF amplifier 4. The output of amplitude modulator 9 is coupled to correlator 11 to produce the system output, namely, a D.C. or low frequency amplitude modulating signal. The additional circuitry coupled to the output of amplifier 9 and the output of mixer 6 is to assure a phase lock between $f_6$ and $f_4$. This is accomplished by employing a second correlator 14 including therein a multiplier 15 and a low pass filter 16, a voltage controlled phase shifter 17, and fixed 90° phase shifter 18.

IF amplifier 19 couples the output from mixer 6 to the voltage controlled phase shifter 17 which causes $f_4$ to be in a 90° phase (e.g. leading) relationship with the carrier signal output of modulator 9. The output of phase shifter 17 is then coupled to multiplier 15 which in turn is coupled to the output of amplitude modulator 9 to produce a control voltage at the output of low pass filter 16. Essentially this arrangement acts as a servo loop since a D.C. control voltage null is obtained for the desired quadrature relationship. The fixed 90° phase shifter 18 (e.g. lagging) is coupled to the output of phase shifter 17 to bring the reference signal $f_4$ in phase with the signal applied to correlator 11 from amplifier 9. With this arrangement both the output of amplitude modulator 9 and the reference signal $f_4$ are in phase synchronism yielding maximum possible D.C. output from the low pass filter 13 and, therefore, maximum output signal-to-noise ratio. However, the low pass filter 16 of correlator 14 has a long time constant and the added circuits are, therefore, useful only for receiving signals varying relatively slowly in frequency, namely, in the order of one cycle per second. It sould be noted, however, that the system is fully operative with output from 13 for a fast deviating received carrier signal but yields a reduced signal-to-noise ratio.

While I have described above the principles of my invention in connection with specific apparatus, it is to be clearly understood that this description is only made by way of example and not as a limitation to the scope of my invention as set forth in the objects thereof and in the accompanying claims.

I claim:

1. A receiver for detecting a first signal immersed in noise, said first signal having a predetermined amplitude characteristic and a carrier frequency whose value is subjected to interfering frequency deviation, comprising:
- a first source of said first signal;
- a second source of a reference signal having a frequency equal to the undeviated value of said carrier frequency;
- frequency converter means coupled to both said first and second sources;
- an amplitude modulator coupled to said first source and said converter means; and
- a first correlator coupled to said modulator and said second source to produce an output signal proportional to said amplitude characteristic of said first signal.

2. A receiver according to claim 1, further including:
- a first full wave rectifier coupled between said modulator and said first correlator; and
- a second full wave rectifier coupled between said second source and said first correlator.

3. A receiver according to claim 1, further including:
- a voltage controlled phase shifter coupled to said second source;
- a phase shifter having a fixed amount of phase shift therein coupled between said voltage controlled phase shifter and said first correlator;
- first means coupled to the output of said modulator and the output of said voltage controlled phase shifter to produce a control signal proportional to the phase difference between said reference signal and said first signal; and
- second means to couple said control signal to said voltage controlled phase shifter to maintain said first signal and said reference signal at a predetermined relative phase relationship.

4. A receiver according to claim 3, wherein:
said phase shifter includes a fixed 90 degree shift, and said voltage controlled phase shifter is voltage controlled by said control signal to establish said predetermined relative phase relationship at 90 degrees.

5. A receiver according to claim 4, wherein said first means includes a second correlator.

6. A receiver according to claim 5, wherein:
said second correlator includes:
- a multiplier coupled to the output of said modulator and the output of said voltage controlled phase shifter, and
- a low pass filter coupled between said multiplier and said second means.

7. A receiver according to claim 1, wherein:
said first correlator includes:
- a first multiplier having two inputs, one of said inputs of said first multiplier being coupled to said modulator and the other of said inputs of said first multiplier being coupled to said second source, and a first low pass filter coupled to the output of said first multiplier.

8. A receiver according to claim 7, further including:

a first full wave rectifier coupled between said modulator and said one input of said first multipler, and a second full wave rectifier coupled between said second source and said other input of said first multiplier.

9. A receiver according to claim 7, further including:

a first conductor coupled between said modulator and said one input of said first multiplier;

a voltage controlled phase shifter coupled to said second source;

a fixed 90 degree phase shifter coupled between said voltage controlled phase shifter and said other input of said first multiplier;

a second correlator coupled to the output of said modulator and the output of said voltage controlled phase shifter to produce a control signal proportional to the phase difference between the signal at the output of said modulator and the signal at the output of said voltage controlled phase shifter, and a second conductor coupling said control signal to said voltage controlled phase shifter to maintain a 90 degree relationship between the signal at the output of said modulator and the signal at the output of said voltage controlled phase shifter.

10. A receiver according to claim 9, wherein:

said second correlator includes:

a second multiplier having two inputs, one of said inputs of said second multiplier being connected directly to the output of said modulator and the other of said inputs of said second multiplier being connected directly to the output of said fixed phase shifter, and a second low pass filter connected directly between the output of said second multiplier and said voltage controlled phase shifter.

References Cited

UNITED STATES PATENTS

| | | | |
|---|---|---|---|
| 3,057,960 | 10/1962 | Kaiser | 179—1 |
| 3,157,781 | 11/1964 | Gruen | 235—181 |
| 3,168,734 | 2/1965 | Adamsbaum | 343—12 |

OTHER REFERENCES

Raemer, Harold R., & Reich, Allen B., Correlation Devices Detect Weak Signals, May 22, 1959, "Electronics," pp. 58–60.

KATHLEEN H. CLAFFY, Primary Examiner

C. JIRAUCH, Assistant Examiner

U.S. Cl. X.R.

343—100